US012511457B1

(12) United States Patent
Codrescu et al.

(10) Patent No.: US 12,511,457 B1
(45) Date of Patent: Dec. 30, 2025

(54) THERMOSPHERE-IONOSPHERE MODEL UPDATING FOR LOW-EARTH ORBITS

(71) Applicant: Vector Space, LLC, Boulder, CO (US)

(72) Inventors: Mihail Codrescu, Boulder, CO (US); Stefan Codrescu, Boulder, CO (US)

(73) Assignee: VECTOR SPACE LLC, Boulder, CO (US)

( * ) Notice: Subject to any disclaimer, the term of this patent is extended or adjusted under 35 U.S.C. 154(b) by 0 days.

(21) Appl. No.: 19/083,631

(22) Filed: Mar. 19, 2025

(51) Int. Cl.
G06F 30/20 (2020.01)

(52) U.S. Cl.
CPC .................................. G06F 30/20 (2020.01)

(58) Field of Classification Search
CPC ..................................................... G06F 30/20
See application file for complete search history.

(56) References Cited

U.S. PATENT DOCUMENTS

| 2022/0083715 A1* | 3/2022 | Mehta | G01W 1/10 |
| 2024/0037297 A1 | 2/2024 | Mehta et al. | |

OTHER PUBLICATIONS

Codrescu SM, Codrescu MV, Fedrizzi M. An ensemble Kalman filter for the thermosphere-ionosphere. Space Weather. Jan. 2018; 16(1):57-68. (Year: 2018).*
Sutton EK, Nerem RS, Forbes JM. Density and winds in the thermosphere deduced from accelerometer data. Journal of Spacecraft and Rockets. Nov. 2007;44(6):1210-9. (Year: 2007).*
Chen, Chia-Hung, et al. "Ionospheric data assimilation with thermosphere-ionosphere-electrodynamics general circulation model and GPS-TEC during geomagnetic storm conditions." Journal of Geophysical Research: Space Physics 121.6 (2016): 5708-5722. (Year: 2016).*
Codrescu, Mihail V., et al.; Storm Time Neutral Density Assimilation in the Thermosphere Ionosphere with TIDA, J. Space Weather Space Clim., Apr. 8, 2022, pp. 1-13, vol. 12, EDP Sciences.
Codrescu, Mikhail V., et al; An ensemble-type Kalman filter for neutral thermospheric composition during geomagnetic storms, Space Weather, 2004, pgs , vol. 2.
Codrescu, Stefan M, et al; An Ensemble Kalman Filter for the Thermosphere-Ionosphere, Space Weather, Jan. 18, 2018, pp. 57-68, vol. 1, American Geophysical Union, Washington, D.C.
Fernandez-Gomez, I. et al. Improving estimates of the ionosphere during geomagnetic storm conditions through assimilation of thermospheric mass density, Earth, Planets and Space vol. 74, Aug. 6, 2022, Article No. 121, vol. 74.

* cited by examiner

*Primary Examiner* — Chuen-Meei Gan
(74) *Attorney, Agent, or Firm* — MP Patents, LLC (57) ABSTRACT

A computer-implemented method for determining an orbital effect on a low-Earth orbiting object includes, forming an ensemble of thermosphere-ionosphere state models to represent thermosphere-ionosphere state model uncertainty, assimilating measured thermosphere-ionosphere data into a select thermosphere-ionosphere state model of the ensemble in accordance with a Kalman gain derived from statistics of the ensemble, computing drag on the low-Earth orbiting object from elements of the assimilated select model of thermosphere-ionosphere state models and randomizing elements of the assimilated select thermosphere-ionosphere model in accordance with statistics of the ensemble to generate a new ensemble of thermosphere-ionosphere state models. A system is arranged to perform the method. A computer program product is arranged to cause one or more computers to perform the method.

5 Claims, 5 Drawing Sheets

THERMOSPHERE-IONOSPHERE MODEL UPDATING FOR LOW-EARTH ORBITS

TECHNICAL FIELD

The disclosure relates to the fields of atmospheric science, data science and orbital mechanics.

SUMMARY

The disclosure describes a computer-implemented method for determining an orbital drag effect on a low-Earth orbiting object. The method includes, forming an ensemble of thermosphere-ionosphere state models to represent thermosphere-ionosphere state model uncertainty, assimilating measured thermosphere-ionosphere data into a select thermosphere-ionosphere state model of the ensemble in accordance with a Kalman gain derived from statistics of the ensemble, computing drag on the low-Earth orbiting object from elements of the assimilated select model of thermosphere-ionosphere state models and randomizing elements of the assimilated select thermosphere-ionosphere model in accordance with statistics of the ensemble to generate a new ensemble of thermosphere-ionosphere state models.

The disclosure also describes a method for orbital adjustment of a low-Earth orbiting object. The method includes measuring thermosphere-ionosphere data remotely from the orbiting object, forming an ensemble of thermosphere-ionosphere state models to represent thermosphere-ionosphere state model uncertainty, assimilating the measured thermosphere-ionosphere data with a select thermosphere-ionosphere state model of the ensemble in accordance with a Kalman gain derived from statistics of the ensemble, computing the state of the orbiting object from elements of the assimilated select model of thermosphere-ionosphere state models, adjusting the orbit of the low-Earth orbiting object in response to determining the computed state of the orbiting object interferes with a state of another orbiting object and randomizing elements of the assimilated select thermosphere-ionosphere state model in accordance with statistics of the ensemble to generate a new ensemble of thermosphere-ionosphere state models.

Further, the disclosure describes a system for determining an orbital drag effect on a low-Earth orbiting object. The system includes a memory and a computing processor. The computing processor is configured by instructions stored on the memory to form an ensemble of thermosphere-ionosphere state models to represent thermosphere-ionosphere state model uncertainty, assimilate measured thermosphere-ionosphere data with a select thermosphere-ionosphere state model of the ensemble in accordance with a Kalman gain derived from statistics of the ensemble, compute drag on the low-Earth orbiting object from elements of the assimilated select model of thermosphere-ionosphere state models and randomize elements of the assimilated select model in accordance with statistics of the ensemble to generate a new ensemble of thermosphere-ionosphere state models.

Further still, the disclosure describes a non-transitory computer-readable medium for determining an orbital drag effect on a low-Earth orbiting object. The non-transitory computer readable medium includes computer-readable instructions which, when executed by a processor cause one or more computers to form an ensemble of thermosphere-ionosphere state models to represent thermosphere-ionosphere state model uncertainty, assimilate measured thermosphere-ionosphere data with a select thermosphere-ionosphere state model of the ensemble in accordance with a Kalman gain derived from statistics of the ensemble, compute drag on the low-Earth orbiting object from elements of the assimilated select model of thermosphere-ionosphere state models and randomize elements of the assimilated select model in accordance with statistics of the ensemble to generate a new ensemble of thermosphere-ionosphere state models.

BRIEF DESCRIPTION OF THE FIGURES

The summary above, as well as the following detailed description of illustrative embodiments, is better understood when read in conjunction with the appended drawings. For the purpose of illustrating the disclosure, example constructions of the disclosure are shown in the drawings. However, the disclosure is not limited to specific methods and instrumentalities disclosed herein. Moreover, those or ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they may be implemented. Although the best mode of carrying out the disclosure has been described, those or ordinary skill in the art would recognize that other embodiments for carrying out or practicing the disclosure are also possible. It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

The accuracy of known physics-based numerical models of the thermosphere-ionosphere in current and future system state specification is limited by incomplete knowledge of system forcing with time. Accounting for system forcing with a proxy index for solar Ultra Violet and Extreme Ultra Violet radiation, statistical patterns of particle precipitation and plasma convention for Joule heating calculation and hourly averaged parameterization of the lower boundary conditions result in large uncertainties.

Since atmospheric drag is a function of neutral density, specification uncertainty in the global neutral density field is of particular importance in tracking space debris, forecasting satellite collisions and projecting satellite lifetimes. Better neutral density specification and forecast can reduce the uncertainty in satellite and debris positioning and reduce satellite fuel consumption required for orbital adjustments. While available measurements can constrain a model state to remain within a desired range relative to the real system state, data assimilation schemes using empirical background models cannot produce results beyond the time of available measurements and their accuracy decreases rapidly with measurement coverage reductions.

Neutral density measurements are difficult to make, limited in number and coverage and suffer from large biases and uncertainties. This makes the option to improve neutral density specification using the plentiful ionospheric measurements very attractive for satellite collision avoidance applications. Disclosed methods correct the state of a physics-based model of the thermosphere-ionosphere with ensemble Kalman filter data assimilation according to measurements more easily obtained than the complete system forcing.

Embodiments of the disclosure substantially eliminate, or at least partially address, problems in the prior art, enabling specification of one or more state elements of Earth's thermosphere-Ionosphere, uncertainty of these state elements, an orbital effect on a low-Earth orbiting object, an orbit state of a low-Earth object, the uncertainty of the orbit state and combinations of these.

Additional aspects, advantages, features and objects of the disclosure will be made apparent from the drawings and the detailed description of the illustrative embodiments construed in conjunction with the appended claims that follow. It will be appreciated that features of the disclosure are susceptible to being combined in various arrangements, both specified and unspecified, without departing from the scope of the disclosure as defined by the appended claims.

Acceleration effects on a low-Earth orbiting object due to drag depends on density of the thermosphere-ionosphere as follows:

$$\vec{a}_D = -\frac{1}{2}\rho \frac{C_D A_{proj}}{m} V_{rel} \vec{V}_{rel}$$

wherein $V_{rel}$ is the relative velocity, $\rho$ is the neutral density, $A_{proj}$ is the projected area of the object, $C_D$ is the drag coefficient and m is the mass of the object.

Disclosed methods enable specification and forecast of neutral density state and thereby drag forces within a sufficiently small uncertainty to predict object orbit with increased certainty. Increased certainty may further enable reduced amplitude of orbital adjustments and thereby conserve energy such as in the form of fuel required to make orbital adjustments.

Figure 1:
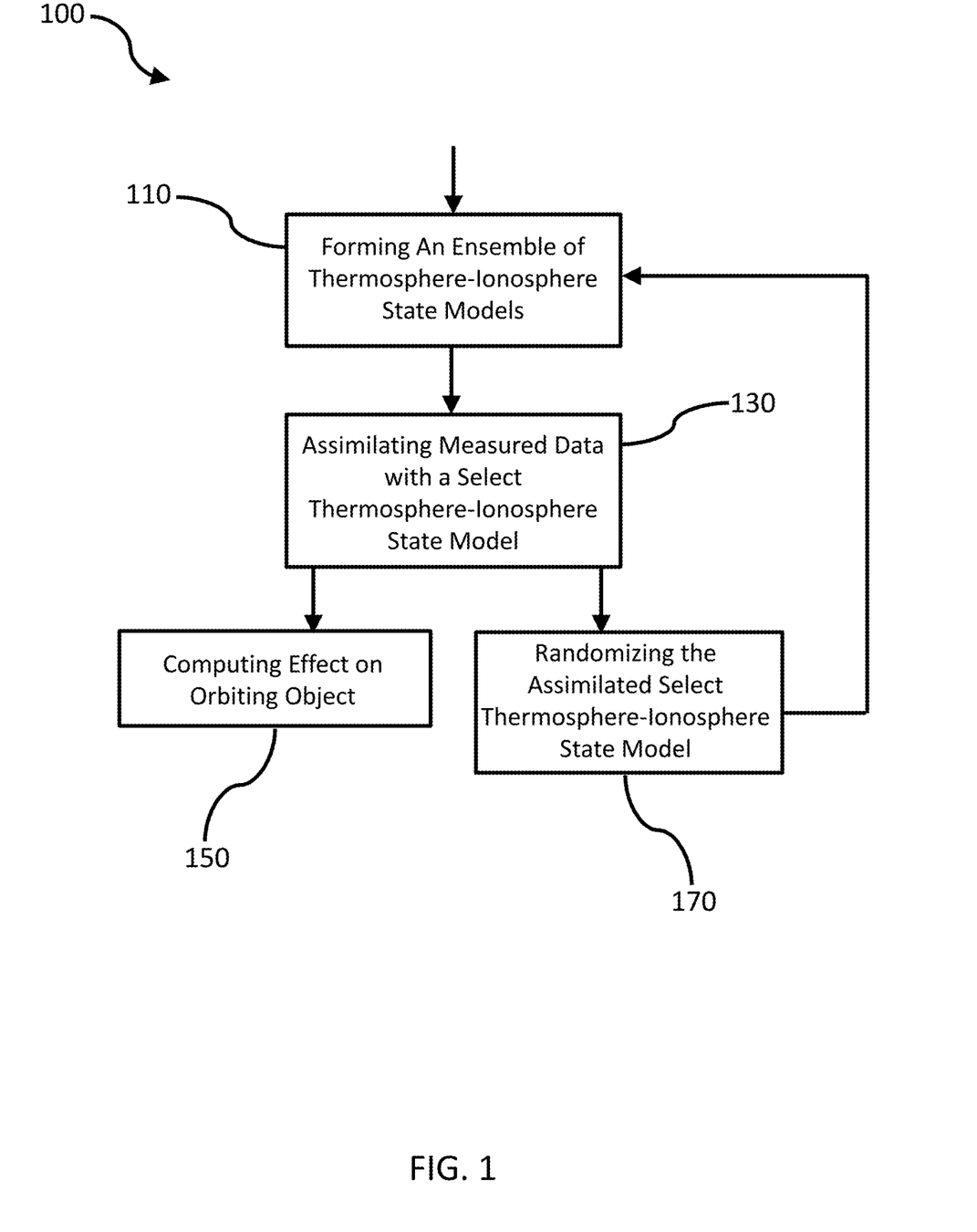
FIG. 1 illustrates a flow of an example method for determining an orbital effect on a low-Earth orbiting object.
Figure 2:
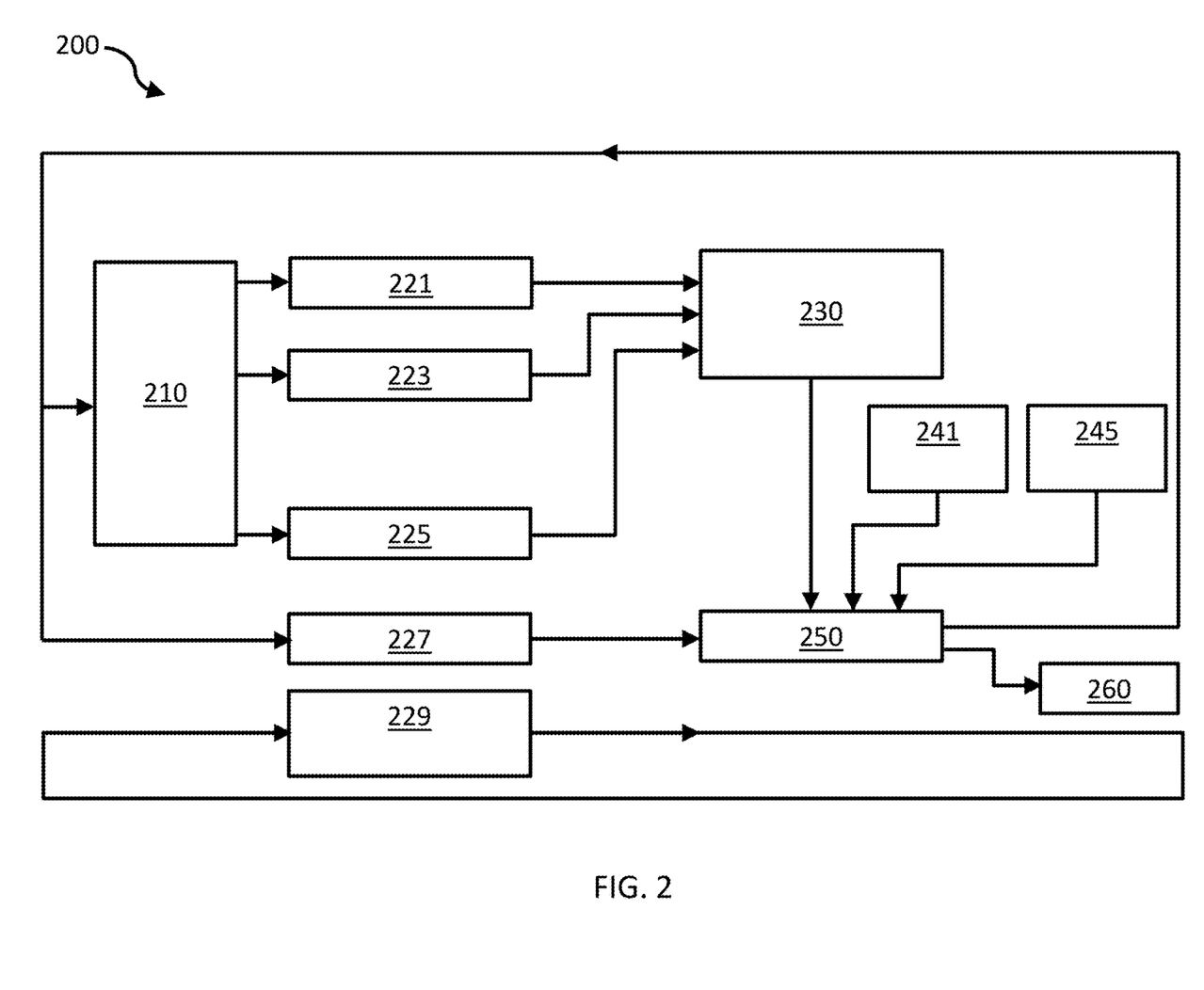
FIG. 2 schematically illustrates example modules of an example data assimilation scheme.

FIG. 1 illustrates actions of a computer-implemented method 100 for determining an orbital drag effect on a low-Earth orbiting object, in accordance with an embodiment of the disclosure employing an ensemble Kalman filter thermosphere-ionosphere data assimilation. The method is depicted as a collection of actions in a logical flow diagram, which represents a sequence of actions that may be implemented in hardware, software, or a combination thereof. FIG. 2 schematically illustrates example modules of an example data assimilation scheme 200 one or more of which may be implemented by hardware, software, data structures or a combination of these.

Method 100 includes, forming an ensemble of thermosphere state models to simulate account for or otherwise represent thermosphere state model uncertainty at 110, assimilating measured ionospheric data with a select thermosphere state model or member of the ensemble in accordance with a Kalman gain derived from statistics of the ensemble at 130, computing the state of the orbiting object from the assimilated select model or member of the thermosphere state models at 150 and randomizing the assimilated select model or member in accordance with statistics of the ensemble to generate a new ensemble of thermosphere state models at 170.

At 110, in accordance with a distribution, perturbation or randomizing mechanism 210 (FIG. 2), an ensemble of thermosphere state models 221, 223, 225 are formed to represent thermosphere state model uncertainty. To form the ensemble of thermosphere state models 221, 223, 225, an initial, select or special model or member 227 is provided. Initial special member 227 includes state components elements and forcing components or elements and may be expressed in the following form:

$$X = \begin{bmatrix} \text{model forcing} \\ \text{model state} \end{bmatrix}$$

wherein X is a column vector representing the total state of the thermosphere-ionosphere system and each of the model forcing and model state elements may further be vectors and/or include a number of further sub-elements or sub-components.

Each model 221, 223, 225, 227 may include four distinct but fully coupled components. By solving the nonlinear primitive equations of momentum, energy and continuity the models simulate the time-dependent structure of wind vectors, temperature and neutral thermosphere density. The models 221, 223, 225, 227 may further include fully dynamic and coupled descriptions of the high-latitude ionosphere and middle- and low-latitude ionosphere and plasmasphere.

In an example, the base and/or background thermosphere-ionosphere system state model is a coupled-thermosphere, ionosphere, plasmasphere and electrodynamics (CTIPe) model, a mass spectrometer incoherent scatter (MSIS) model, a multi-scale atmospheric-geospace environment (MAGE) model or a combination of these. For the purposes of data assimilation, the models will be evaluated at a series of points in time or time steps. In an example, the models are evaluated once every 10 to 30 minutes.

Since a complete set of state model elements may be ponderously numerous, a chosen subset of forcing elements and/or state elements may be realized in the models. In an example, state elements included within the models are those sufficient for calculating neutral density. In a further example, state elements of interest include neutral temperature, mass mixing ratios for atomic oxygen, molecular oxygen and molecular nitrogen, mean molecular mass, and both vertical and horizontal components of neutral wind.

In an example, forcing elements accounted for in the models 221, 223, 225, 227 include heating, dissolution and ionization rates $F_{10.7}$, solar wind speed $|V_{SW}|$, solar wind density $\rho_{SW}$, magnitude of the solar wind interplanetary magnetic field $B_N$, solar wind magnetic field angle $B_\theta$, activity level (spatial distribution of energy input from partical precipitation) and hemispheric power (total energy carried into the system by partical precipitation). $F_{10.7}$ may be provided as measured by the Penticton Radio Observatory while $|V_{SW}|$, $\rho_{SW}$, $B_N$ and $B_\theta$ may be provided as measured by the Advanced Composition Explorer satellite. Forcing for tides, gravity waves and planetary waves propagating into the thermosphere are accounted for in the CTIPe model by an hourly reproducible lower boundary condition.

Further, parameterization of tides, gravity waves and planetary waves propagating into the Thermosphere-Ionosphere from below forcing elements may also be accounted for. In yet a further example, the select state model additionally or alternatively includes eddy state diffusion.

The ensemble of state models 221, 223, 225 may be produced in any of a variety of perturbations or randomizations of the initial special member 227. The forcing parameters form a basis for the uncertainty over which the ensemble is able to effectively sample enable distributing or randomizing the ensemble in a globally coherent manner. One or more of the forcing elements are perturbed in accordance with distribution mechanism 210 which may distribute or randomize the ensemble according to any of a variety of techniques. For example, samples may be taken from normal distributions of those forcing elements. In a further example, an independent and identically distributed set of input forcing parameters are applied to each ensemble member. $F_{10.7}$ may be sampled from a normal distribution such as:

N (0,50) or N (0,3);

|Vsw| may be sampled from a normal distribution such as: N (0,50) or N (0,20);

$\rho_{sw}$ may be sampled from a normal distribution such as: N (0,5) or N (0, 2.4);

$B_N$ may be sampled from a normal distribution such as: N (0,20) or N (0,6);

$B_\Theta$ may be sampled from a normal distribution such as: N (0,50) or N (0,10);

activity level may be sampled from a normal distribution such as:

N (0,2); and hemispheric power may be sampled from a normal distribution such as:

N (0,20)

Spurious correlations may be avoided by randomizing a relatively small number of state elements across a relatively large ensemble. In an example, a count of members of the ensemble is greater than a count of randomized forcing elements in each ensemble member by an order of magnitude. In an example, there are 75 ensemble members and the seven forcing elements set forth above. In some cases, it may be advantageous to additionally/alternatively randomize the state elements.

The initial special member 227 has state elements defined by current model state predictions and forcing elements defined by measured forcing parameters. In subsequent assimilation steps, the ensemble member whose forcing is equal to the mean of the distribution from which the ensemble member forcings are sampled will be the special member 227.

At 130, measured state data 245 is assimilated with special member 227 of the ensemble in accordance with a Kalman gain derived from statistics of the ensemble 221, 223, 225. The assimilated or analysis state 250 is the sum of the forecast state and the covariance of the measured and forecast state/description/specification according to:

$$x^a = x^f + K(y - h(x_f))$$

where x, y are state and measurement vectors and K is a matrix representing the Kalman gain.

With an ensemble state mean and an ensemble observation mean, the state error vector can be computed by taking a difference between the ensemble state mean and the individual member for state vector elements while the observation error vector can be computed by taking a difference between the observation mean and the individual observation vector elements as represented in the following:

$$E_x = [x^{f_1} - \overline{x^f} \ldots x^{f_q} - \overline{x^f}]$$

$$E_y = [y^{f_1} - \overline{y^f} \ldots y^{f_q} - \overline{y^f}]$$

The state-measurement error covariance can be determined from the state error vector and the observation error vector as follows:

$$P_{xy} = \frac{1}{q-1} E_x \{E_y\}^T$$

$$P_{yy} = \frac{1}{q-1} E_y \{E_y\}^T$$

The Kalman gain may be derived by calculator 230 from the state-measurement error covariance, the measurement error covariance and an observation error covariance (R) according to:

$$\hat{K} = P_{xy}(P_{yy} + R)^{-1}$$

A good estimate of the global time-dependent covariant matrix inferred independently during each assimilation time step should not contain spurious correlations in which implausible quantities influence each other. All measurements may be assimilated without the need of a localization scheme and the model is brought into agreement with measurements.

The state data assimilated may represent any of a variety of sets of state measurements including but not limited to neutral atmosphere and/or and ionosphere/plasmasphere measurements. Thermospheric data 241 to be assimilated including neutral density measurements may be made by challenging minisatellite payload (CAMP) and/or gravity recovery and climate experiment (GRACE). Accelerometers on board these systems are sensitive enough to estimate the in situ neutral density based on acceleration due to drag forces. Such state data may be obtained ahead of assimilation runs and be provided from a repository or database. Ionospheric data 245 to be assimilated may be measured from a constellation of radio-occultation satellites such as constellation observing system for meteorology ionosphere and climate (COSMIC-2), or ground-based ionosphere measurements like ionosonde, digisondes and incoherent scatter radar measurements. Measurements may be made at locations remote from the orbiting object.

In order to avoid cross influences between assimilation data sets and interpretation ambiguities, assimilation may be limited to ionospheric TEC measurements from COSMIC-2 constellation.

When only ionospheric data 245, a subset of state elements, is assimilated with the forecast model, forcing elements and other state elements are influenced by the assimilation through non-localization of the covariance matrix. Resulting corrections due to observations are made globally through the entire state. Spurious correlations are avoided by randomizing a relatively small number of elements across a relatively large ensemble. The assimilated or analysis state is realized at 250.

Using the initial conditions and inputs that would have been available in an operational real time run, a reference member 229 may be run in parallel with no assimilation for comparison.

State elements of Earth's Thermosphere-Ionosphere, uncertainty of these state elements, an orbital effect on a low-Earth orbiting object, an orbit state of a low-Earth object, the uncertainty of the orbit state and combinations of these as represented by structure 260, are computed from the assimilated select model of the ensemble and output at 150. For example, the relevant elements are used to compute the neutral density elements which are used to compute the acceleration due to drag.

With an analysis/updated version of the state including forcing, the next assimilation step may be taken by casting the analysis/updated version into a forecast special member which may then be randomized into an ensemble. While disclosed methods are generally described above as applying a correction to both model state and forcing alternatives may be desirable. In another example, a correction is applied only to the model state. In yet another example, a correction is applied only to the forcing. The assimilated select model may be randomized to generate a new ensemble of thermosphere state models each having state elements retained from the assimilated select model. Perturbations of individual member forcing are chosen from a normal distribution centered on the forcing estimated during the previous assimilation time step. Again, an independent and identically distributed set of input forcing parameters may be applied to each ensemble member. All members of the ensemble are started from the best estimate of the system state obtained in the previous assimilation time step.

The method further includes assimilating updated, measured ionospheric data with a new select thermosphere state model of the new ensemble in accordance with a new Kalman gain derived from statistics of the new ensemble and continues until the desired number of assimilation steps or time stamps have been completed.

The actions 110 to 170 are only illustrative and other alternatives can also be provided where one or more actions are added, one or more actions are removed, or one or more actions are provided in a different sequence without departing from the scope of the claims herein.

Figure 3:
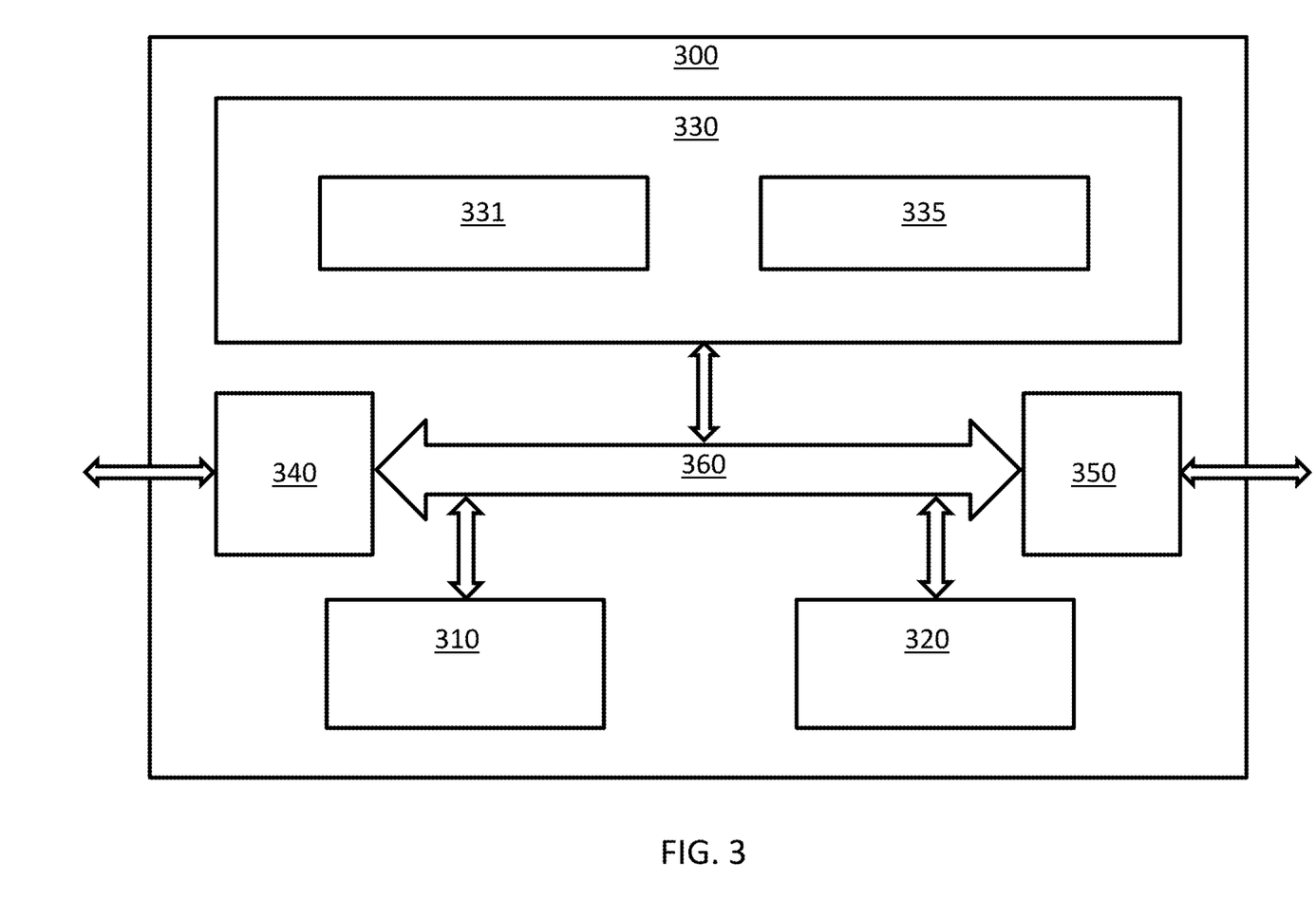
FIG. 3 schematically illustrates an example system for determining an orbital effect on a low-Earth orbiting object.

Disclosed methods may be suitable for execution on any of a variety of computing systems. FIG. 3 is a schematic illustration of various components of an example system 300 in the form of a data processing unit, in accordance with an embodiment of the disclosure. Data processing unit 300 may be implemented by way of at least one of: a PC, a laptop computer and a desktop computer.

Data processing unit 300 includes, but is not limited to, a computing hardware such as a processor 310, a data memory 320, a storage 330, Input/Output (I/O) devices 340, a network interface 350, and a system bus 360 that operatively couples various components including processor 310, data memory 320, storage 330, Input/Output (I/O) devices 340 and network interface 350.

Processor 310 implemented may be any of a variety of processors suitable for quickly processing large amounts of data. In an example, processor 310 has 32 cores or more and has a base frequency of at least 2.7 GHZ. Example processors include but are not limited to M3 Ultra offered Apple, Ryzen Threadripper 2990WX offered by AMD, Ryzen Threadripper 7970X offered by AMD and Zeon W-3365 offered by Intel.

Data memory 320 optionally includes non-removable memory, removable memory, or a combination thereof. The non-removable memory, for example, includes Random-Access Memory (RAM), SRAM, DRAM or RMM. Data memory 320 may have any of a variety of capacities suitable for storing information during processing of large amounts of data. In an example, RAM is included which has a capacity of at least 64 GB.

Storage 330 optionally includes non-removable memory, removable memory, or a combination thereof. The non-removable memory, for example, includes Read-Only Memory (ROM), flash memory, or a hard drive. The removable memory, for example, includes flash memory cards, memory sticks, or smart cards. Moreover, storage 330 is a non-transient data storage medium.

In addition to other applications 335, storage 330 stores a software product 331 and/or computer readable instructions associated with the thermosphere ionosphere data assimilation service. The computer readable instructions may include syntax suitable for C++ programming. The computer readable instructions may inform or cause the execution of computations through an Eigen linear algebra library. The computer readable instructions may format files in NetCDF to facilitate interfacing with a CTIPe model, a MSIS model or a MAGE model.

Executing software product 331 on processor 310 may result in generating and rendering a graphical user interface on the display screen configured to facilitate user interactions with disclosed thermosphere ionosphere data assimilation services. Software product 331, when executed on processor 310, optionally couples processor 310 to storage 330, and is configured to substantially continuously record and update model state elements, forcing elements and ensemble statistics therein.

I/O devices 340 include a mouse or a joystick operable to receive inputs corresponding to clicking, pointing, and/or moving a pointer object on the graphical user interface and a keyboard operable to receive inputs corresponding to pushing certain buttons on the keyboard. I/O devices 340 include a display screen for presenting graphical images to a user of data processing unit 310. In an example, the display screen is a touch-sensitive display screen that is operable to receive tactile inputs from the user. These tactile inputs may, for example, include clicking, tapping, pointing, moving, pressing and/or swiping with a finger or a touch-sensitive object like a pen. Additionally, I/O devices 340 may also include a microphone for receiving an audio input from the user, and a speaker for providing an audio output to the user.

Network interface 350 optionally enables data processing unit 300 to upload assimilation results to a server, for example, via a communication network. Additionally, network interface 350 may enable data processing unit 300 to access a server to download and/or update measurements, parameters and/or other data for use with disclosed assimilation services and/or to download or update software products associated with disclosed assimilation services and/or download one or more new software products. Moreover, network interface 350 optionally allows data processing unit 300 to communicate with other data processing units, for example, via a communication network.

Data processing unit 300 also includes a power source (not shown) for supplying electrical power to the various components thereof. The power source may, for example, include a rechargeable battery.

Executing instructions of software product 331 on processor 310 causes data processing unit 300 and/or processor 310 to perform and/or to be configured to perform a series of actions associated with a thermosphere ionosphere data assimilation service. The instructions stored to memory 330, when executed by one or more computers, are configured to perform actions of the methods described with reference to FIG. 1 and/or FIG. 2. As actions of the disclosed methods may be provided in different sequences, so the computer-executable code may be configured to provide a service having a different sequence of actions from those illustrated in FIG. 1 and FIG. 2.

Processor 310 is configured by instructions stored on storage 330, such as the aforementioned software product 331, to form an ensemble of thermosphere state models to represent thermosphere state model forcing uncertainty. The ensemble of thermosphere state models may be formed of coupled-thermosphere, ionosphere, plasmasphere and electrodynamics state models such that each includes forcing elements. A count of members of the ensemble may be greater than a count of randomized forcing elements in each ensemble member.

Processor 310 is configured by the instructions to assimilate measured ionospheric data with a select thermosphere state model of the ensemble in accordance with a Kalman gain derived from statistics of the ensemble. The Kalman gain may be derived from a non-localized covariance matrix of ensemble member state elements. The ionospheric data may be measured by a constellation of radio-occultation satellites and may be measured remotely from an orbiting object for which a state or state effect is desired.

Processor 310 is configured by the instructions to compute the state of the orbiting object from the assimilated select model of thermosphere state models. The state may be output by I/O 340, for example, to a display in the form of one or more graphs, plots or curves. In a further example, the state may be output to an orbital controller of an orbiting object for use in one or more orbital adjustments.

Processor 310 is configured by the instructions to perform ongoing steps of data assimilation by randomizing the assimilated select model in accordance with statistics of the ensemble to generate a new ensemble of thermosphere state models. In particular, the processor may randomize the forcing elements of the assimilated select model in accordance with samples from normal distributions of forcing elements. State elements may be retained from the assimilated select model. Processor 310 may be further configured to assimilate updated, measured ionospheric data with a new select thermosphere state model of the new ensemble in accordance with a new Kalman gain derived from statistics of the new ensemble.

Software product 331 may further include or provide for configuration input. For example, software product 331 may provide a dashboard as part of the aforementioned user interface to enable changing various settings for the software product and/or the ensemble Kalman filter data assimilation service. In another example, a user may provide configuration input to software product 331 as a separate configuration file that is loaded by the software product. Example, configuration inputs include but are not limited to allowing forcing to be turned on/off, adjusting how much change is permitted in a given parameter in a single assimilation window, setting date, setting the number of assimilation members, setting the assimilation time window, choosing Kalman state elements, choosing measurements to be assimilated and adjusting sampling techniques for distributing the ensemble.

System 300 is also suitable for determining uncertainty in one or more states of an orbiting object. Further, system 300 may be suitable for use in implementing a system for energy conservation during orbiting object collision avoidance manoeuvres.

FIG. 3 is merely an example, which should not unduly limit the scope of the claims herein. It is to be understood that the specific designation for data processing unit 300 is provided as an example and is not to be construed as limiting the data processing unit to specific numbers, types, or arrangements of modules and/or components of the data processing unit. A person or ordinary skill in the art will recognize many variations, alternatives, and modifications of embodiments of the disclosure.

Embodiments of the present disclosure also provide a computer program product that includes a non-transitory or non-transient computer-readable storage medium storing computer-executable code for determining an orbital effect on a low-Earth orbiting object. As set forth above in reference to the system and/or data processing unit 300, the computer-executable code stored, when executed, by one or more computers are configured to perform actions of the methods described with reference to FIG. 1 and/or FIG. 2. Again, the computer-executable code may be configured to provide a service having a different sequence of actions from those illustrated in FIG. 1 and FIG. 2.

The software product may be executed or implemented in a single computing device or in a distributed computing environment, where tasks are performed by remote processing devices or systems that are linked through a communications network. For example, in accordance with one embodiment, an assimilation module is executed or implemented in a local computing system, while the user interface module is executed or implemented in the remote computing system. In some examples, the code may be downloaded from a software application store, for example, from an "App store", to a data processing unit.

Embodiments of the present disclosure also provide a computer program product that includes a non-transitory or non-transient computer-readable storage medium storing computer-executable code for energy conservation during orbiting object collision avoidance manoeuvres.

Figure 4:
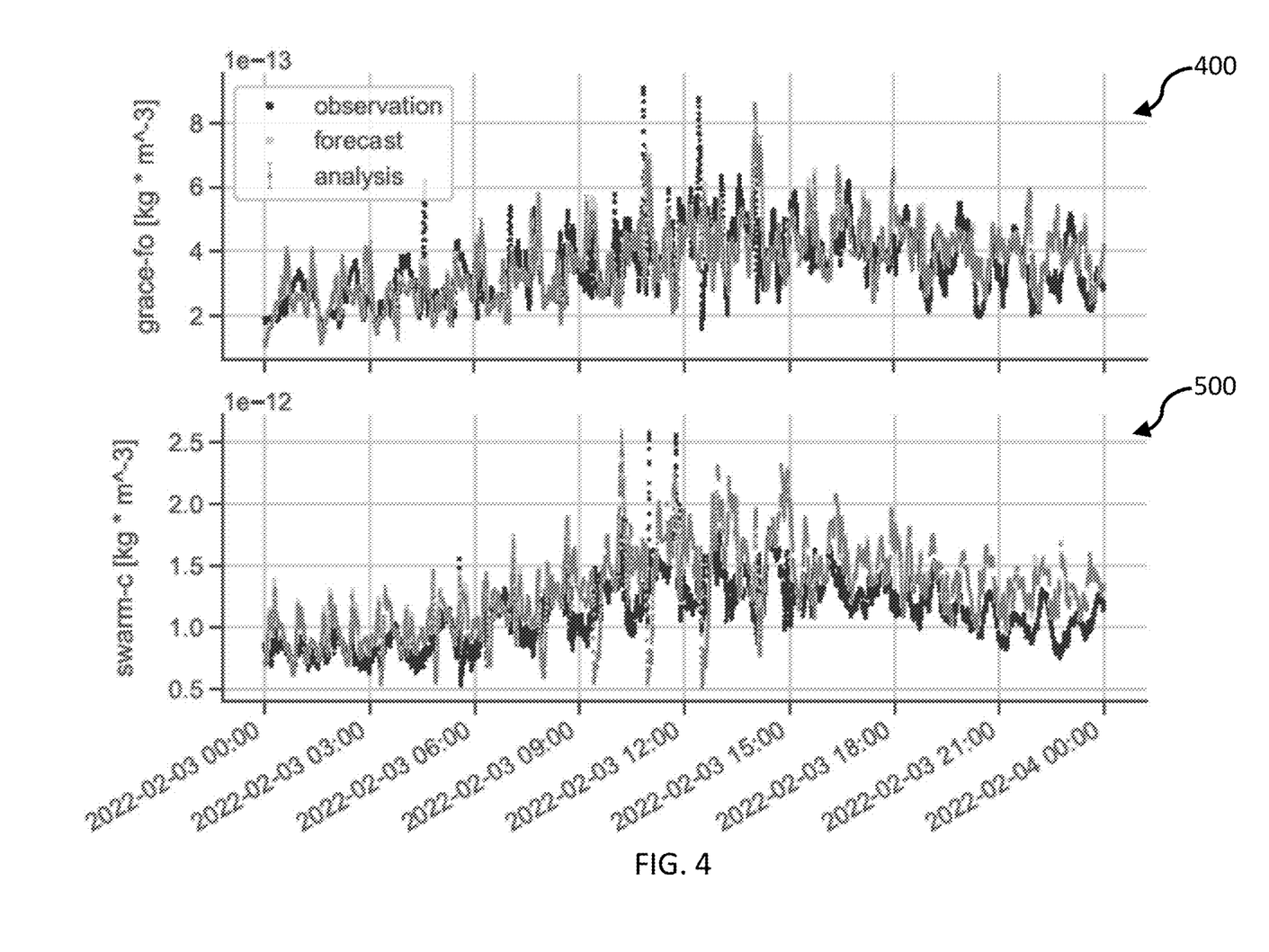
FIG. 4 illustrates example plots of neutral density vs. time for first and second measurement systems.

FIG. 4 illustrates example plots of neutral density vs. time of a variety which may be output by I/O 340 of system 300 in accordance with actions of programmed processor 310. Plot 400 illustrates neutral density vs. time for gravity recovery and climate experiment measurements while plot 500 illustrates neutral density vs. time for European Space Agency's Swarm-C.

Figure 5:
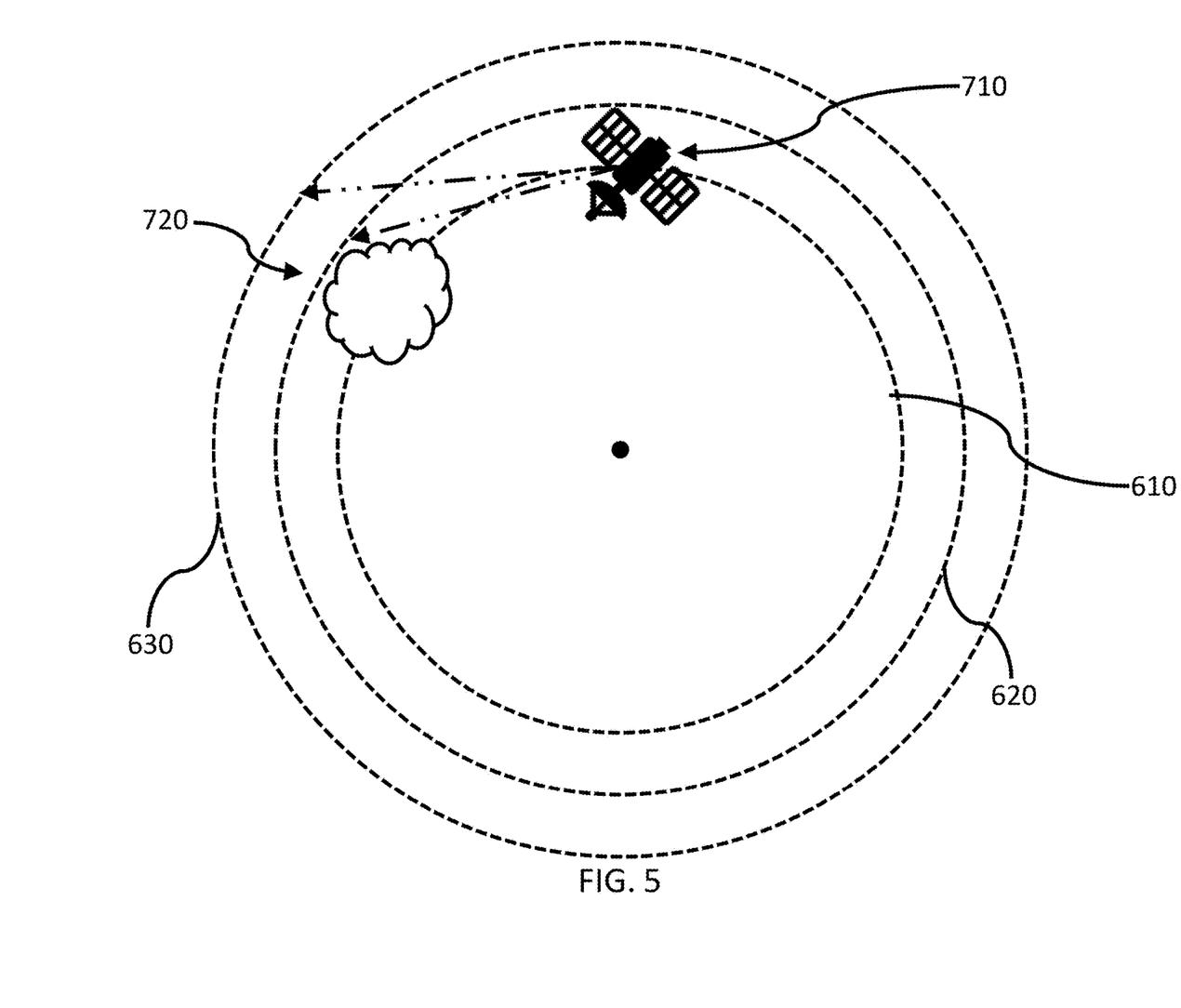
FIG. 5 schematically illustrates an example orbiting satellite and example space debris.

FIG. 6 schematically illustrates an example orbiting satellite 710 travelling along an orbit 610 and example space debris 720 intercepting orbit 610. To avoid space debris 720, satellite 710 will require an orbital adjustment to orbit 620. However, uncertainty in the thermosphere-ionosphere state specification necessitates a trajectory on course with 630 for some factor of safety. This excess amplitude of orbital adjustment demands additional energy. With less uncertain state elements of Earth's Thermosphere-Ionosphere, orbital effect on a low-Earth orbiting objects, orbit states of a low-Earth object, and combinations of these output from system 300 an adjustment with a trajectory closer to 620 may be possible to reduce excess amplitude of orbital adjustments and associated energy expenditure.

Embodiments of the disclosure are susceptible to being used for various purposes, including, though not limited to, enabling users to employing an ensemble Kalman filter thermosphere-ionosphere data assimilation service to specify one or more state elements of Earth's thermosphere-Ionosphere, uncertainty of these state elements, an orbital effect on a low-Earth orbiting object, an orbit state of a low-Earth object, the uncertainty of the orbit state and combinations of these to thereby determine an orbital effect on a low-Earth orbiting object, determine an orbital state of a low-Earth orbiting object and/or conserve energy during orbiting object collision avoidance manoeuvres or other orbital adjustments.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. A method for orbital adjustment of a low-Earth orbiting object in real time, comprising:

measuring thermosphere-ionosphere data remotely from the low Earth orbiting object during an operation run;

forming an ensemble of thermosphere-ionosphere state models to represent thermosphere-ionosphere state model uncertainty;

assimilating only ionosphere data of the measured thermosphere-ionosphere data into a select thermosphere-ionosphere state model of the ensemble in accordance with a Kalman gain derived from statistics of the ensemble;

computing the state of the low-Earth orbiting object from elements of the assimilated select thermosphere-ionosphere state model of thermosphere-ionosphere state models;

with reduced fuel consumption, adjusting the orbit of the low-Earth orbiting object during the operation run in response to the computed state of the low-Earth orbiting object collides with of another orbiting object;

randomizing elements of the assimilated select thermosphere-ionosphere model in accordance with statistics of the ensemble to generate a new ensemble of thermosphere-ionosphere state models; and repeating the assimilating using updated ionosphere only data with the new select thermosphere-ionosphere state model of the new ensemble in accordance with a new Kalman gain derived from statistics of the new ensemble until a desired number of assimilation steps have been completed.

2. The method as set forth in claim 1, wherein randomizing the elements of the assimilated select model further comprises randomizing forcing elements.

3. The method as set forth in claim 1, wherein a count of members of the ensemble is greater than a count of randomized elements in each ensemble member.

4. The method as set forth in claim 1, wherein assimilating only ionosphere data with the select model of the ensemble in accordance with the Kalman gain derived from statistics of the ensemble further comprises assimilating in accordance with a Kalman gain derived from a non-localized covariance matrix of ensemble member state elements.

5. The method as set forth in claim 1, wherein assimilating only ionosphere data further comprises assimilating ionosphere data measured remotely from the orbiting object.

* * * * *